(12) United States Patent
Nozoe

(10) Patent No.: US 6,619,122 B1
(45) Date of Patent: Sep. 16, 2003

(54) ANGULAR SPEED SENSOR

(75) Inventor: Toshiyuki Nozoe, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 19 days.

(21) Appl. No.: 09/857,870

(22) PCT Filed: Oct. 17, 2000

(86) PCT No.: PCT/JP00/07186

§ 371 (c)(1),
(2), (4) Date: Aug. 30, 2001

(87) PCT Pub. No.: WO01/29509

PCT Pub. Date: Apr. 26, 2001

(65) Prior Publication Data (65)

(30) Foreign Application Priority Data

Oct. 18, 1999 (JP) .............................................. 11-295052

(51) Int. Cl.⁷ ................................................ G01P 9/04
(52) U.S. Cl. .................................................. 73/504.16
(58) Field of Search ..................... 73/504.16, 504.15, 73/504.12; 310/329, 370, 348

(56) References Cited

U.S. PATENT DOCUMENTS 4,674,331 A    6/1987  Watson ..................... 73/504.16
5,343,749 A  * 9/1994  Macy ....................... 73/504.16

FOREIGN PATENT DOCUMENTS

| EP | 0 171 378 | 2/1986 |
| EP | 0 450 933 | 10/1991 |
| JP | 60-185111 | 9/1985 |
| JP | 61-93907 | 5/1986 |
| JP | 62-228111 | 10/1987 |
| JP | 2-64508 | 3/1990 |
| JP | 3-289529 | 12/1991 |
| JP | 4-32254 | 2/1992 |
| JP | 4-106444 | 4/1992 |
| JP | 9-303561 | 11/1997 |
| JP | 11-10894 | 1/1999 |

* cited by examiner

Primary Examiner—John E. Chapman
(74) Attorney, Agent, or Firm—Wenderoth, Lind & Ponack, L.L.P.

(57) ABSTRACT

An angular velocity sensor has a tuning-fork-type vibrator securely and stably fixed to a support block. A base of a tuning-fork-type vibrator is embedded and fixed into a mounting recess formed in the support block with an adhesive.

2 Claims, 5 Drawing Sheets

ANGULAR SPEED SENSOR

FIELD OF THE INVENTION

The present invention relates to an angular velocity sensor used for car navigation and control on an orientation of a vehicle.

BACKGROUND OF THE INVENTION

An angular velocity sensor includes a tuning-fork-type vibrator made of crystal vibrated by a driving electrode disposed on the vibrator. A deflection amount of the vibrator due to Coriolis force is represented as an electric signal through a detection electrode disposed on the vibrator. The Coriolis force, when an angular velocity is applied to the vibrator, is generated orthogonally to the vibration direction of the tuning-fork.

For example, the angular velocity sensor includes a bulk-type of the tuning-fork-type vibrator made of crystal or the like. The vibrator is formed by removing an unnecessary portion from a material having an area larger than that of the vibrator by etching or cutting. A supporting part supports the tuning fork and makes the tuning folk independent of the outside regarding vibration. Sintered material or crystal material is expensive and requires a large amount of processing to be formed into a complex shape. Therefore, a method of supporting and fixing the tuning-fork-type vibrator using an independently-produced member is considered so as to reduce material cost as low as possible and to allow easy manufacturing.

However, the tuning-fork-type vibrator made of this kind of material cannot employ a brazing method due to the composition of the material. As a result, the vibrator is adhered with a resin-based adhesive to be supported and fixed.

Referring to FIG. 7 through FIG. 9, a conventional angular velocity sensor will be explained. In FIG. 7 through FIG. 9, reference numeral 1 denotes a tuning-fork-type vibrator made of crystal or piezoelectric ceramics. An angular velocity sensor element comprises a base 1c formed at one side of a pair of legs 1a, 1b, and a driving electrode and a detecting electrode, which are not shown, are formed on legs 1a, 1b. Reference numeral 2 denotes a supporting block which is made of metal, ceramic, crystal, or resin material and is mounted on a board 5 including a processing circuit, which is not shown. The end surface of the base 1c of the tuning-fork-type vibrator 1 is supported and fixed to a side of the supporting block 2 with an adhesive 7.

In the conventional angular velocity sensor, the tuning-fork-type vibrator 1 of a beam structure has an end surface fixed to the supporting block 2 with the adhesive 7. Therefore, the sensor has weak adhering strength with a lot of variation of the adhering strength, and is not manufactured with a high level of reliability to withstand shock applied from the outside.

SUMMARY OF THE INVENTION

It is an object of the present invention to provide an angular velocity sensor that has high strength mounting of a tuning-fork-type vibrator to a support block and high stability of supporting the vibrator.

To achieve the object, in the angular velocity sensor of the present invention, a mounting recess having a shape close to that of a cross section of a base of the tuning-fork-type vibrator is formed in the support block, and the base of the tuning-fork-type vibrator is embedded and fixed into the mounting recess with an adhesive.

This structure allows the tuning-fork-type vibrator to be adhered and fixed to the support block with a stable strength for shock and stress.

DETAILED DESCRIPTION OF THE PREFERRED EMBODIMENT

Embodiment 1

Figure 7:
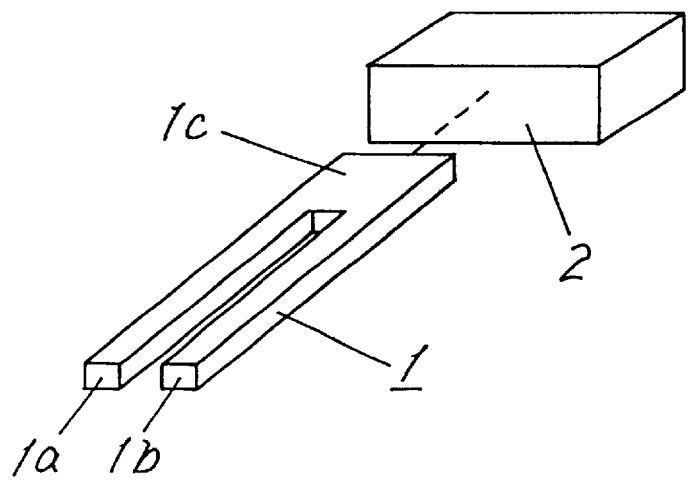
FIG. 7 is a perspective view of an assembled conventional angular velocity sensor.
Figure 8:
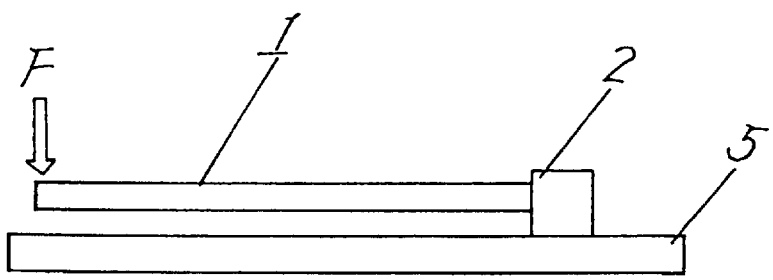
FIG. 8 is a side view of the conventional angular velocity sensor.
Figure 9:
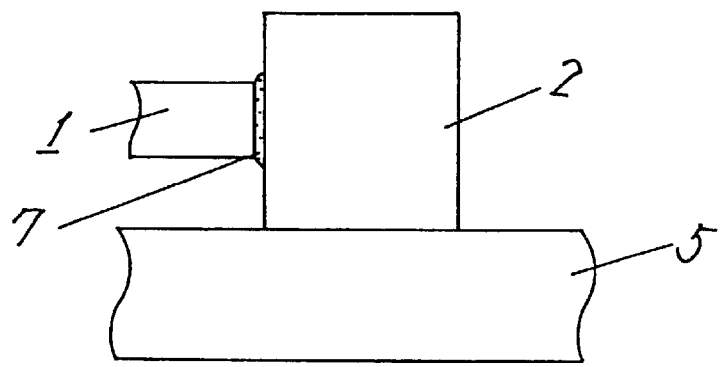
FIG. 9 is a side view of an enlarged essential portion of the conventional velocity sensor.

An angular velocity sensor in accordance with an exemplary embodiment of the present invention will be hereinafter described. FIG. 1 through FIG. 5 show the angular velocity sensor in accordance with the embodiment. In FIG. 1 through FIG. 5, the same elements in the conventional angular velocity sensor shown in FIG. 7 through FIG. 9 will be denotes with the same reference numbers, and will not be described in detail. The angular velocity sensor of the embodiment differs from the conventional angular velocity sensor shown in FIG. 7 through FIG. 9 in the following features. A mounting recess 8 in a shape close to that of a cross section of a base 1c of a tuning-fork-type vibrator 1 is formed in a side surface of a support block 2. A base 1c of the tuning-fork-type vibrator 1 is embedded into mounting recess 8; and the base 1c is adhered to the mounting recess 8 with an adhesive 7. Therefore, the support block 2 supports the tuning-fork-type vibrator 1 with a cantilever structure. The mounting recess 8 has a quadrangular shape, and escape holes 9a, 9b, 9c, 9d, each of which has a substantially round shape, are formed at corners of the quadrangular shape, respectively. When the base 1c of tuning-fork-type vibrator 1 is inserted and fixed to the mounting recess 8 with the adhesive 7, the escape holes 9a through 9d allow an excess adhesive to escape even if a large amount of the adhesive 7 is applied. Accordingly, an optimum amount of the adhesive 7 interleaved between the surfaces of the base 1c and mounting recess 8 is maintained.

Figure 1:
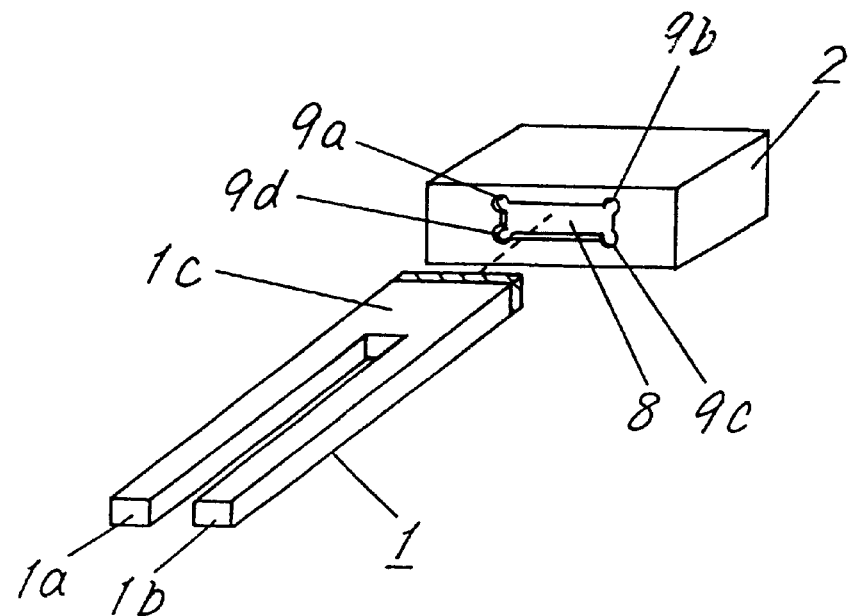
FIG. 1 is a perspective view of an assembled angular velocity sensor in accordance with an exemplary embodiment of the present invention.
Figure 2:
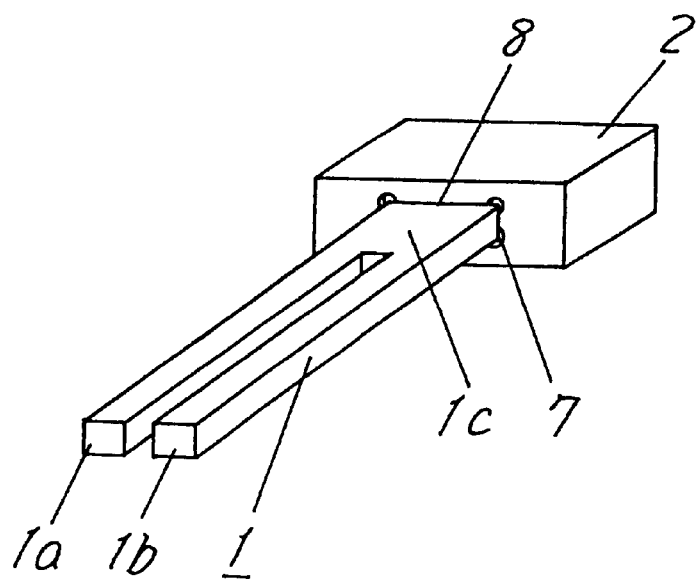
FIG. 2 is a perspective view of the angular velocity sensor.
Figure 3:
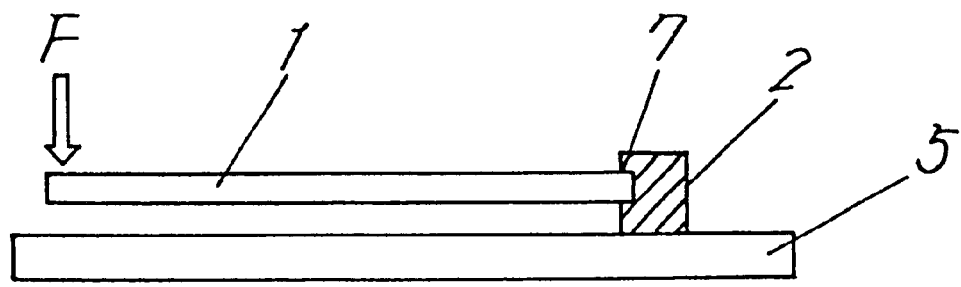
FIG. 3 is a cross sectional view of the angular velocity sensor.
Figure 4:
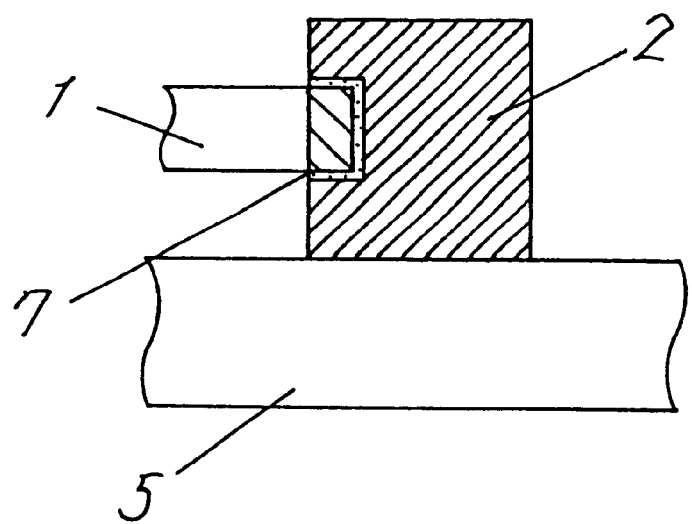
FIG. 4 is a cross sectional view of an enlarged essential portion of the angular velocity sensor.
Figure 5:
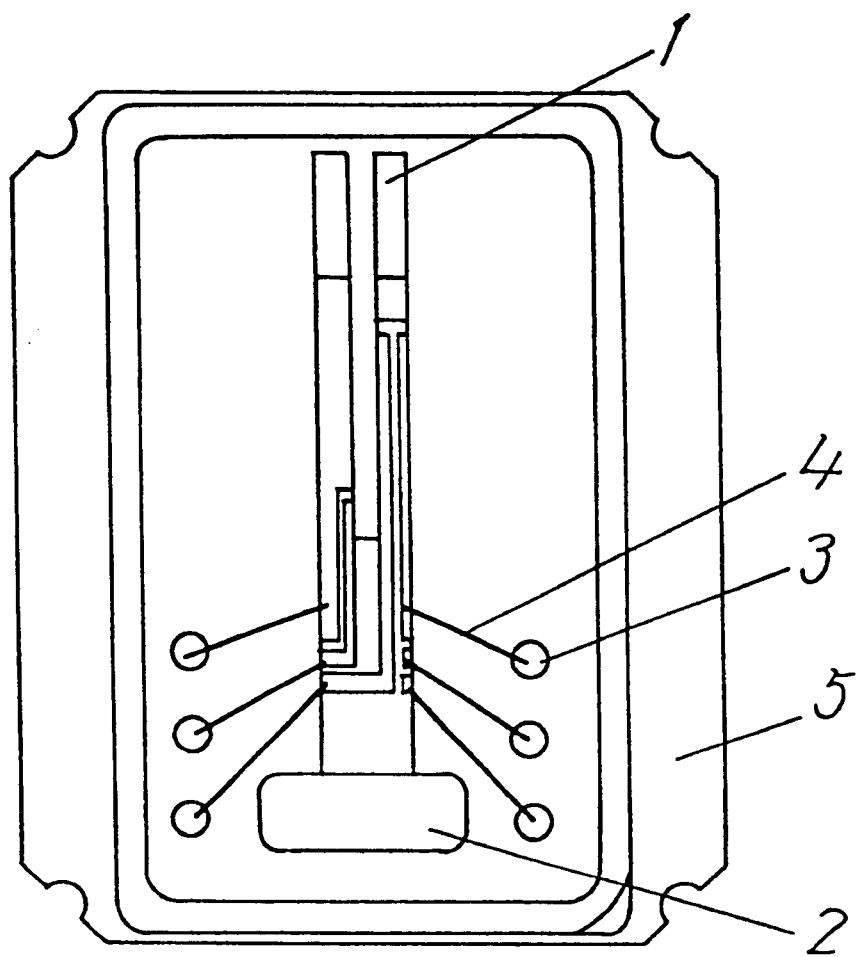
FIG. 5 is a plan view of the angular velocity sensor.

The tuning-fork-type vibrator 1 supported with the cantilever structure is connected to a terminal 3 formed on a board 5 through a lead wire 4 as shown in FIG. 5, and is hermetically sealed with a can, which is not shown.

Figure 6:
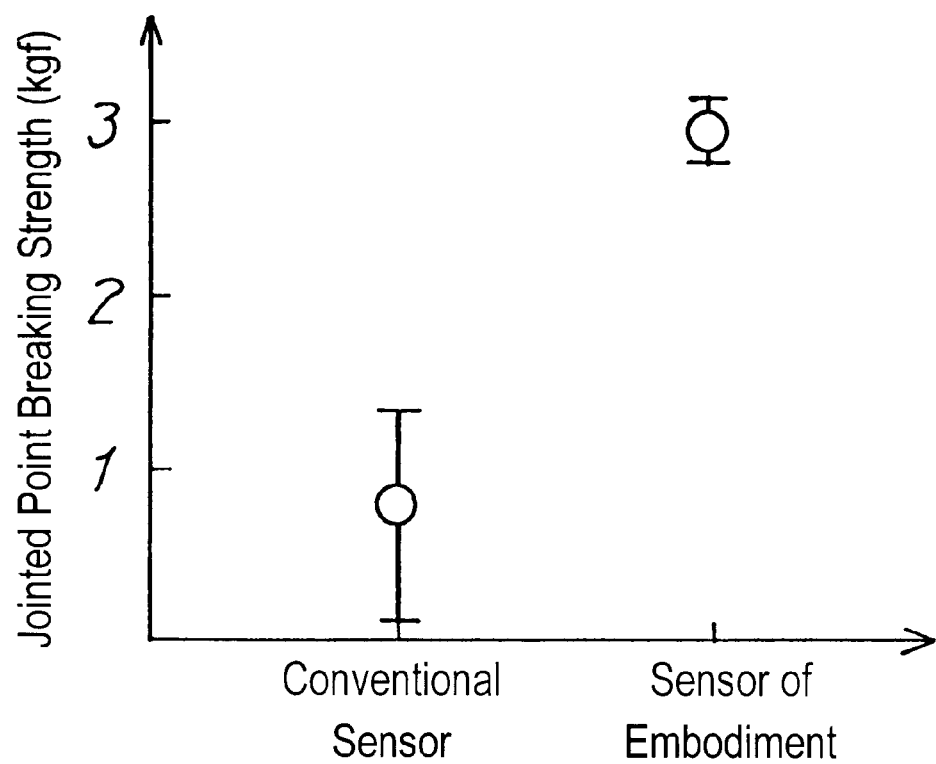
FIG. 6 is a comparative characteristic diagram between the angular velocity sensor and a conventional angular velocity sensor.

FIG. 6 is a comparative characteristic diagram between the angular velocity sensor in accordance with the embodiment of the present invention and the conventional angular velocity sensor. In FIG. 6, a force F, which is applied to the end of the tuning-fork-type vibrator, at which the adhering portion is broken is plotted. FIG. 6 shows that the angular velocity sensor in accordance with the embodiment has a drastically higher breaking strength and a suppressed variation of the strength as compared with the conventional angular velocity sensor.

The escape holes 9a through 9d of the adhesive 7 are formed at respective corners of the quadrangular shape in accordance with the present embodiment. An escape hole, however, may be formed at least at one of the corners.

In accordance with the embodiment, the angular velocity sensor has the tuning-fork-type vibrator with two legs. The sensor, however, may have a tuning-fork-type vibrator with two or more legs, for example, three legs.

Industrial Applicability

The present invention provides an inexpensive, highly-reliable angular velocity sensor as a result of a base of a tuning-fork-type vibrator being embedded into a mounting recess formed in a support block, and the vibrator is thus strongly supported and fixed with a small variation of strength.

What is claimed is:

1. An angular velocity sensor comprising:

an angular velocity sensor element including a tuning-fork-type vibrator having a plurality of legs and a base formed at respective ends of said plurality of legs; and a support block for supporting said base, said support block having a mounting recess with a shape close to a shape of a cross section of said base, wherein at least a portion of said base is embedded and fixed to the mounting recess with an adhesive, and wherein the mounting recess has a quadrangular shape and an escape hole for the adhesive formed at a corner of the mounting recess.

2. The angular velocity sensor in accordance with claim 1, wherein said angular velocity sensor element comprises a means to detect, as an angular velocity signal, a deflection amount of said tuning-fork-type vibrator due to Coriolis force applied orthogonally to a vibration direction in said tuning-fork-type vibrator.

* * * * *

UNITED STATES PATENT AND TRADEMARK OFFICE
CERTIFICATE OF CORRECTION

PATENT NO. : 6,619,122 B1
DATED : September 16, 2003
INVENTOR(S) : Toshiyuki Nozoe It is certified that error appears in the above-identified patent and that said Letters Patent is hereby corrected as shown below:

<u>Title page,</u>
Item [54], the title should read as follows: -- ANGULAR VELOCITY SENSOR --

Signed and Sealed this

Sixteenth Day of March, 2004

JON W. DUDAS
*Acting Director of the United States Patent and Trademark Office*